United States Patent [19]
Iacovelli et al.

[11] Patent Number: 6,089,671
[45] Date of Patent: Jul. 18, 2000

[54] WHEEL COVER FORMED AS A SIMULATED DISC BRAKE

[75] Inventors: Marc Iacovelli; Saied Hussaini, both of Miami, Fla.

[73] Assignee: Rally Manufacturing, Inc., Miami, Fla.

[21] Appl. No.: 09/182,322

[22] Filed: Oct. 30, 1998

[51] Int. Cl.⁷ .................................................. B60B 7/00
[52] U.S. Cl. ......................................... 301/37.1; D12/209
[58] Field of Search ........................... 301/37.1, 37.29, 301/37.37, 37.42; D12/204, 209, 211; 188/218 A

[56] References Cited

U.S. PATENT DOCUMENTS

| | | | |
|---|---|---|---|
| 2,709,114 | 5/1955 | Plotkin | 301/37.1 |
| 5,820,225 | 10/1998 | Ferriss et al. | 301/37.1 |

FOREIGN PATENT DOCUMENTS

| | | | |
|---|---|---|---|
| 2402196 | 4/1975 | Germany | 301/37.42 |
| 2821646 | 11/1979 | Germany | 301/37.1 |

*Primary Examiner*—Russell D. Stormer
*Attorney, Agent, or Firm*—Liniak, Berenato, Longacre & White

[57] ABSTRACT

A simulated brake disc incorporated into a wheel assembly that simulates a disc brake appearance and attaches to a wheel cover to improve the look of the wheel. The simulated disc brake rotor member is formed to emulate the shape and appearance of a rotor member typically found in high performance disc brake systems, and it provides two primary benefits; first, it covers the worn-out and less attractive hub, wheel and brake assembly associated with wheel and, second, it simulates a more expensive, high performance disc brake system which is favored by car enthusiasts.

9 Claims, 4 Drawing Sheets

WHEEL COVER FORMED AS A SIMULATED DISC BRAKE

BACKGROUND OF THE INVENTION a) Field of the Invention

This invention relates to new and improved wheel ornamentation that supplements the look of a traditional wheel cover and wheel/tire assembly by further including a simulated brake disc or rotor.

b) Description of Related Art

Conventional wheel/tire assemblies incorporate a wheel cover or hub cap affixed to the exterior of the wheel to provide a impressive or aesthetic appearance to an otherwise unattractive wheel/tire assembly. Historically, an open-faced wheel/tire assembly that exposed the brake disc or rotor member of the brake system was preferred to a standard closed-faced wheel and wheel cover assembly by car enthusiasts. While open-faced wheel/tire assemblies have been simulated by snap-on or otherwise affixed hub caps, these assemblies resulted in the exposure of worn-out and less attractive hub, wheel and brake assemblies.

The need therefore exists for ornamentation capable of being retrofit onto a wheel/tire assembly to supplement the appearance of the assembly.

SUMMARY OF THE INVENTION

The present invention provides a novel and useful simulated brake disc incorporated into a wheel assembly that simulates a disc brake appearance and attaches to a wheel cover to improve the look of the wheel.

It is the object of the present invention to provide a simulated brake disc that is quickly and easily affixed to the interior of a wheel cover to thereby provide an improved appearance.

DETAILED DESCRIPTION OF THE PREFERRED EMBODIMENT

Figure 1A:
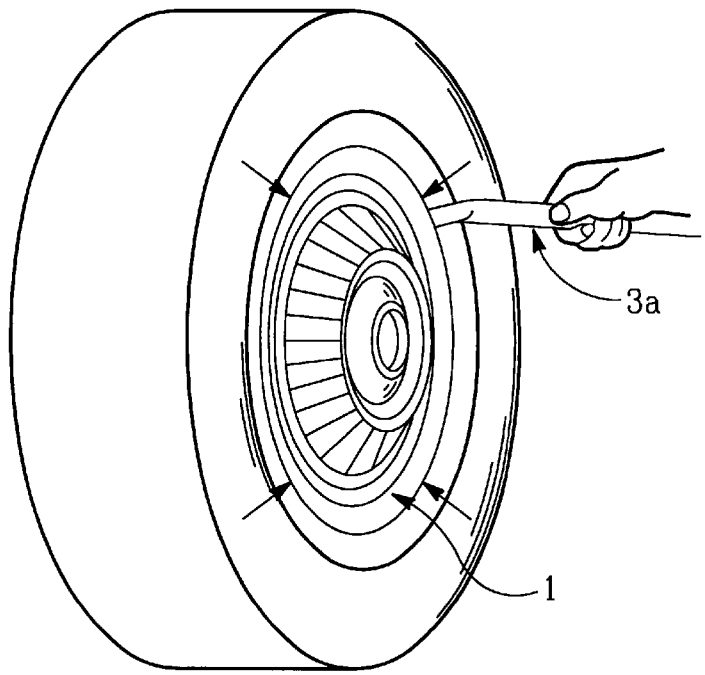
FIGS. 1a and 1b perspective views illustrating a conventional wheel cover assembly that is snap-fit to the exterior of a wheel/tire assembly.
Figure 1B:
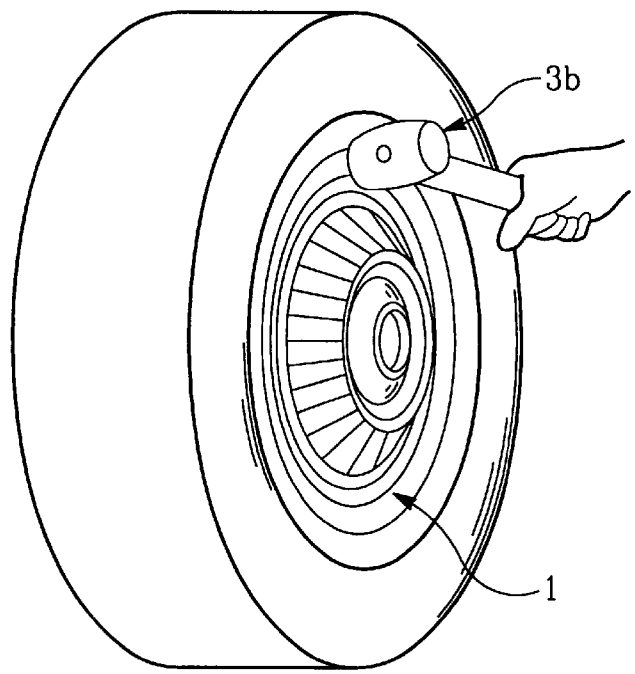

FIGS. 1a and 1b show a conventional wheel cover 1 designed to be press fit onto the original wheel 2 to hide the lug nuts, dust cap and other less attractive parts, whereby the wheel cover is typically removed from the wheel by means of a lug wrench or large screwdriver 3a and typically press fit onto the wheel by means of a rubber hammer 3b.

Figure 2:
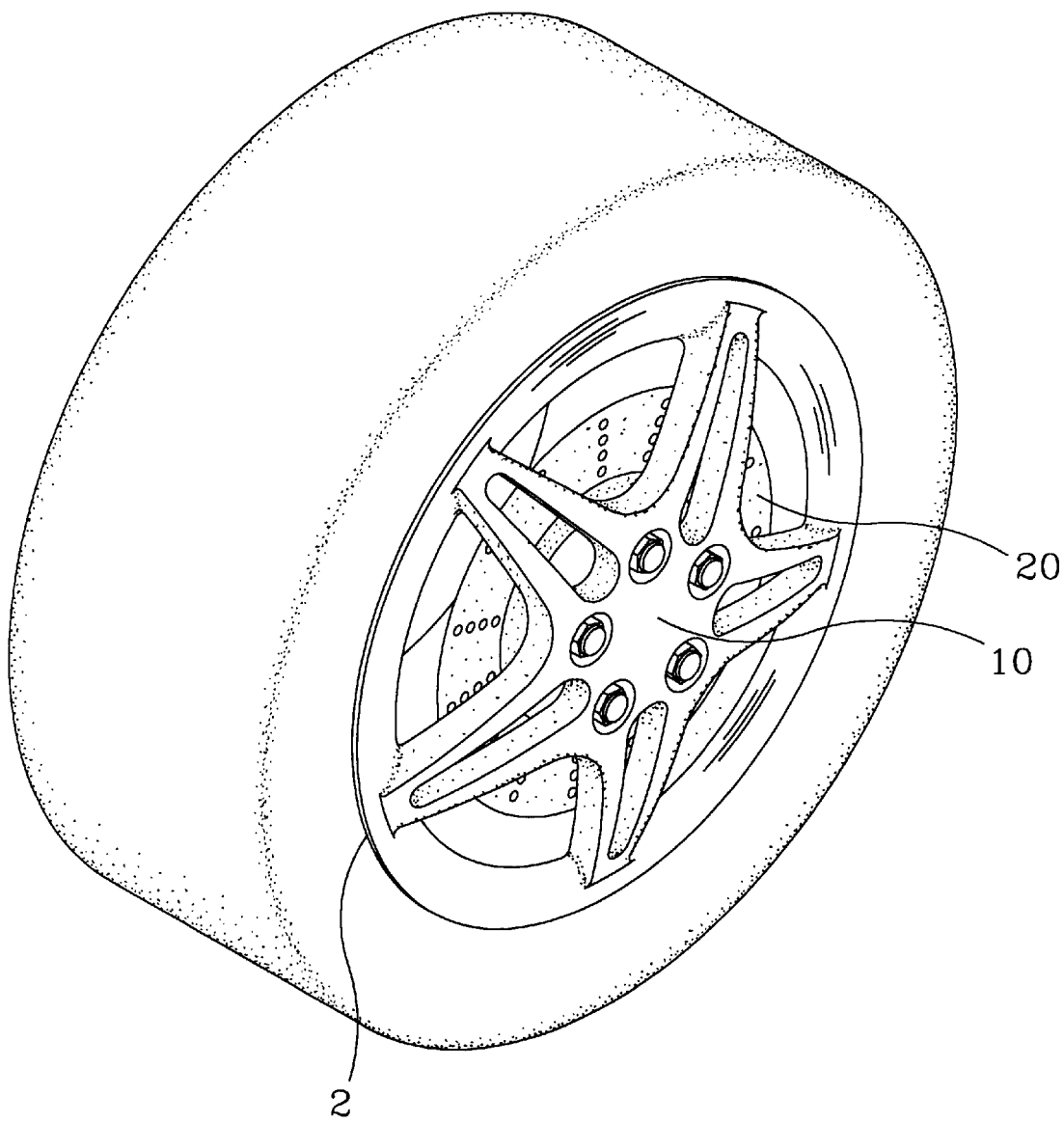
FIG. 2 is a perspective view of a wheel/tire assembly with a wheel cover incorporating the simulated brake disc of the present invention.

With reference to FIG. 2, the present invention includes a wheel cover 10 that fastens to the wheel 2 by a snap-fit or press-fit design, or other conventional fastening means as with the conventional wheel covers. The wheel cover 10 preferably comprises viewing windows 12 defined by the spokes or legs 14 formed in the wheel cover to add style and ornamentation to the wheel cover 10. Affixed to the inside of the wheel cover 10 is a simulated brake disc or rotor member 20 that is fastened to the inner side of the wheel cover by screws, bolts, bayonet tangs or other conventional fastening means 30 sufficient to affix the simulated disc brake 20 to the wheel cover 10 with strength to weather the rigors of driving.

Figure 3:
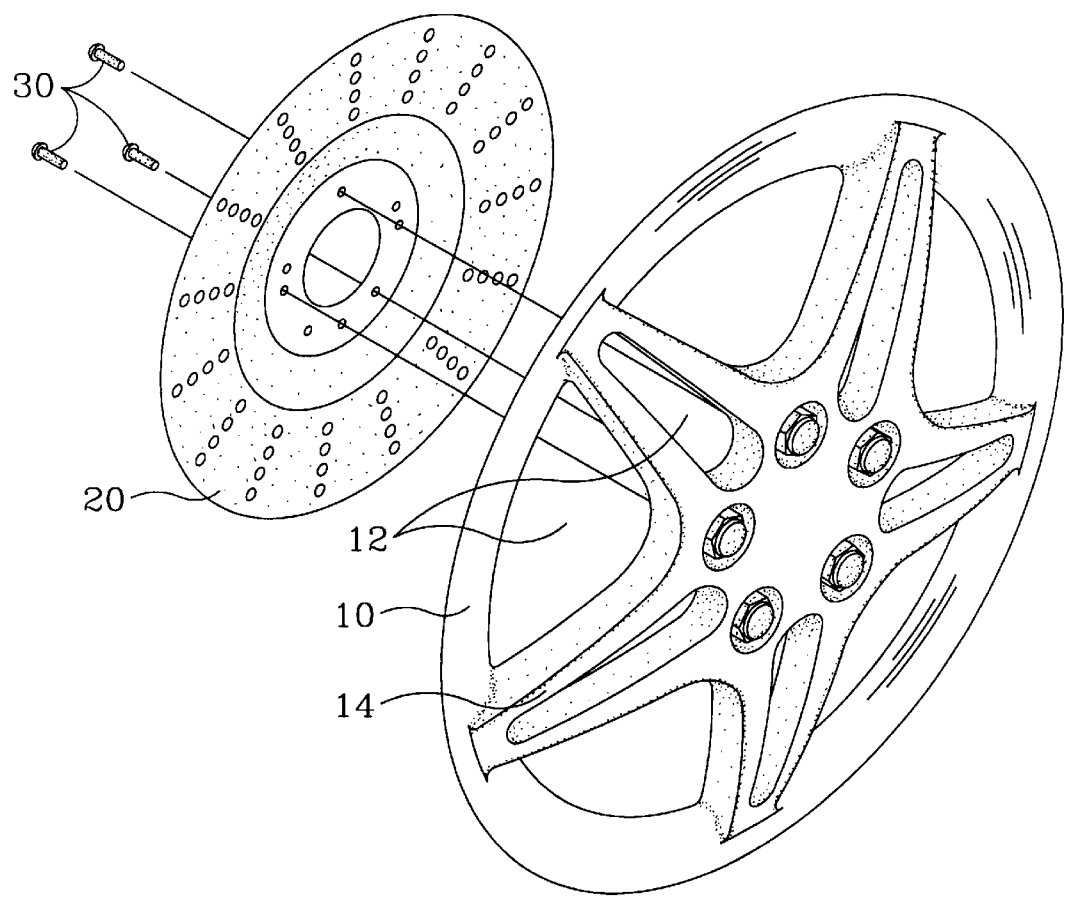
FIG. 3 is an exploded view showing the simulated brake disc and wheel cover assembly in a disassembled state.

The simulated disc brake or rotor member 20 is formed to emulate the shape and appearance of a rotor member typically found in high performance disc brake systems. The simulated brake disc member 20 provides a two-part enhancement to the natural appearance of the wheel 2; first, the brake disc member 20 covers the worn-out and less attractive hub, wheel and brake assembly associated with wheel 2 and, second, the brake disc member 20 simulates a more expensive, high performance disc brake system which is favored by car enthusiasts. Moreover, the simulated disc brake member 20 is particularly suited for wheel cover members such as illustrated in FIGS. 2 and 3 which are aesthetically pleasing as a result of their high exposure, narrow spoke design.

Figure 5:
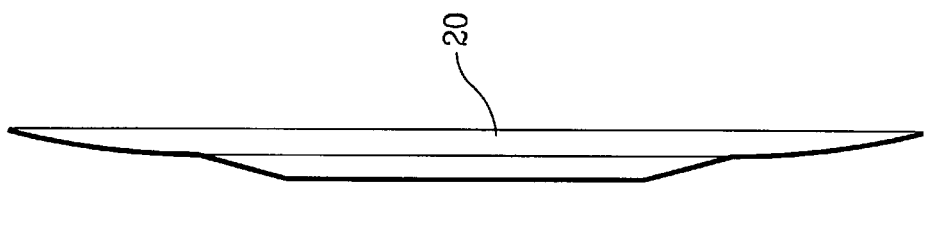
FIG. 5 is a side view of the simulated brake disc of the present invention.
Figure 4:
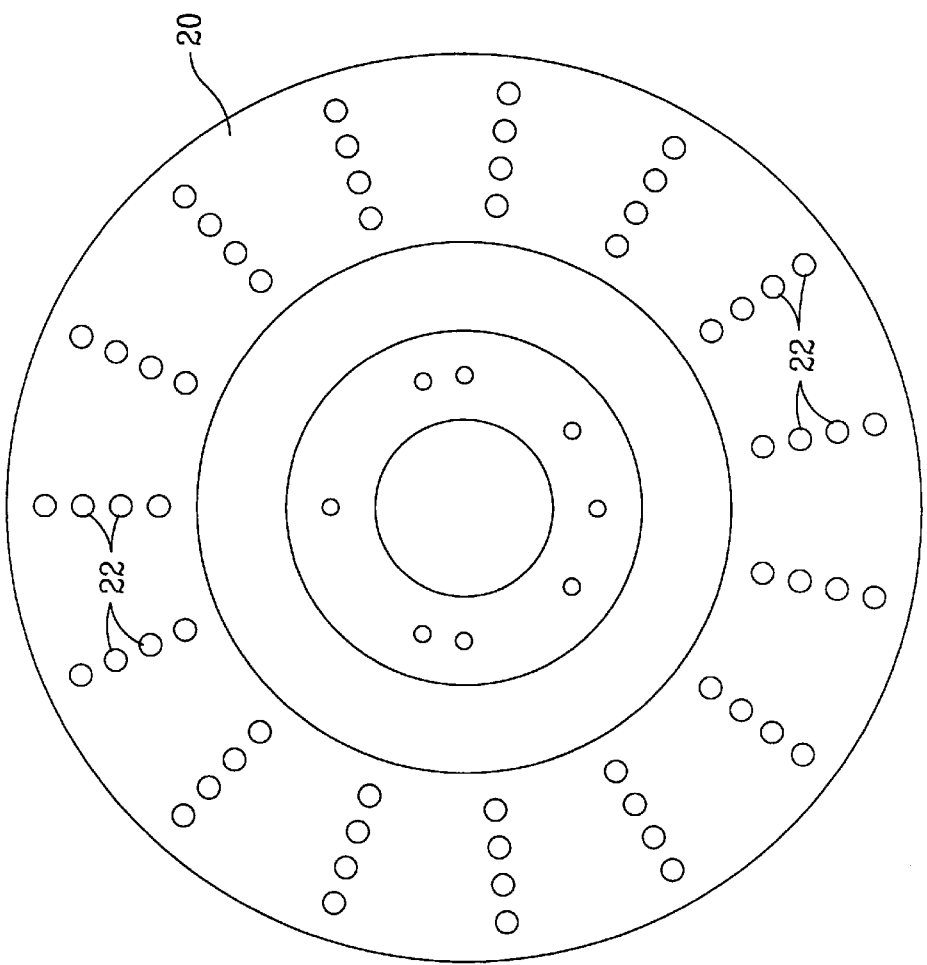
FIG. 4 is a front view of the simulated brake disc of the present invention.

FIGS. 4 and 5 illustrate the simulated disc brake member 20 of this invention which is modelled after a high enforcement disc brake rotor including a plate shaped much like a Belleville spring (see FIG. 5) with a cooling apertures 22 typically formed on high performance brake disc members.

While the foregoing invention has been shown and described with reference to a preferred embodiment, it will be understood by those of skill in the art that various changes in form and detail may be made without departing from the spirit and scope of the invention.

I claim:

1. A wheel cover assembly, comprising:

a wheel cover member having viewing windows formed therein;

fastening means for fastening said wheel cover member to a vehicle wheel in a fastened position;

a simulated disc brake rotor member disposed adjacent a side of said wheel cover member facing said vehicle wheel in said fastened position, said simulated disc brake rotor member being formed as a circular plate visible through said viewing windows provided in said wheel cover member.

2. The wheel cover assembly of claim 1, wherein said simulated disc brake rotor member is removably affixed to said wheel cover member.

3. The wheel cover assembly of claim 1, wherein said simulated disc brake rotor member is formed as a single plate having a central aperture.

4. The wheel cover assembly of claim 1, wherein said simulated disc brake rotor member is provided with cooling apertures radially disposed on said simulated disc brake rotor member.

5. The wheel cover assembly of claim 1, wherein said simulated disc brake rotor member is formed to emulate a high performance disc brake rotor and is not functionally attached to a functioning braking system.

6. The wheel cover assembly of claim 1, wherein said simulated disc brake rotor member defines a surface area visible through a majority of area defined by said viewing windows provided in said wheel cover member.

7. The wheel cover assembly of claim 2, wherein said simulated disc brake rotor member is removably affixed to said wheel cover member by means of screws.

8. The wheel cover assembly of claim 2, wherein said simulated disc brake rotor member is removably affixed to said wheel cover member by means of bolts.

9. The wheel cover assembly of claim 2, wherein said simulated disc brake rotor member is removably affixed to said wheel cover member by means of snap fit members formed in one of said simulated disc brake rotor member and said wheel cover member.

* * * * *